United States Patent Office 3,355,347
Patented Nov. 28, 1967

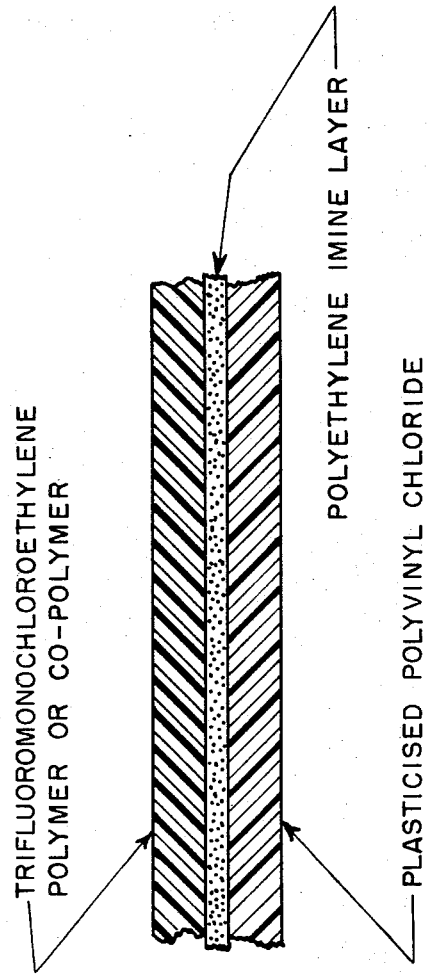

3,355,347
LAMINATED FILM AND PROCESS FOR
PREPARING IT
Kenneth R. Habermann, Wood-Ridge, N.J., assignor to
Allied Chemical Corporation, New York, N.Y., a corporation of New York
Filed Oct. 9, 1964, Ser. No. 402,727
7 Claims. (Cl. 161—189)

This invention relates to laminated films of trifluoromonochloroethylene polymers and plasticized polyvinyl chloride.

It is known to combine various polymer films to each other by means of intermediate bonding agents or adhesives.

The lamination of fluorocarbon polymer films to other surfaces presents greater than usual difficulties, due to the inherent lack of wettability of this type of film, so that in general, unless these films are chemically etched, adhesion of other films or coatings thereto is poor.

Plasticized polyvinyl chloride films also present difficulties in lamination due to the tendency of the plasticizer to migrate from the polyvinyl chloride film into the adhesive layer, thus destroying or weakening the bond.

It is an object of the present invention to provide a laminated film made up of a layer of trifluoromonochloroethylene polymer or copolymer and a layer of plasticized polyvinyl chloride, bonded by an intermediate adhesive layer which is substantially unaffected by the polyvinyl chloride plasticizer.

This and other objects are accomplished according to my invention wherein a thermoplastic film of poly(trifluoromonochloroethylene) or copolymers thereof with vinylidene fluoride or tetrafluoroethylene wherein the trifluoromonochlorethylene comprises at least a major proportion of the polymer, or mixtures thereof, is coated with a thin film of a polymerized ethylene imine and thereafter a film of plasticized polyvinyl chloride is impressed upon the coated surface of the polytrifluoromonochloroethylene film under heat and pressure to effect a strong bond therewith.

The single figure of the annexed drawing illustrates the composite laminate structure of my invention in cross section and shows the thin polyethylene imine bonding layer between the relatively thicker polytrifluoromonochloroethylene layer and the plasticized polyvinyl chloride layer.

In preparing the laminate of my invention, polymerized ethylene imine is applied to the preformed trifluoromonochloroethylene polymer film, suitably from aqueous solution, or from solution in water and a lower aliphatic alcohol such as isopropanol, in any desired concentration, suitably from about ½% to about 5% polymer solids. Any suitable conventional coating or adhesive application system may be used, such as, for example, reverse roll coaters, gravure rolls, air knife coating or kiss roll coating. After deposition of the coating on the trifluoromonochloroethylene polymer film, the solvent is removed by evaporation as by passage through an oven at temperatures suitably at about 220° F.–300° F., resulting in superior peel strength of the resulting lamination. The coating solution will more effectively wet the polytrifluoromonochloroethylene surface if the polymer film has been subjected to an electronic treatment such as a corona discharge for example, in a Lepel Corona Treater or similar device, but such treatment is not essential.

The application of the polymerized ethylene imine to the trifluoromonochloroethylene polymer can be performed as part of an in-line laminating operation, or as a separate operation, and the coated polymer film can be wound up in a roll with a suitable interleaver to prevent possible coating transfer until such time as the plasticized polyvinyl chloride film is to be adhered thereto.

The plasticized polyvinyl chloride film is applied to the precoated polytrifluoromonochloroethylene film in any of the conventional forms of application, for example;

(a) As a preformed film combined between squeeze rolls, one of which is heated and the other not heated. The hot roll is in contact with the polytrifluoromonochloroethylene film, and should be at such temperature as to appreciably soften at least that portion of the plasticized polyvinyl chloride film which comes directly in contact with the polyethylene imine coating on the fluorochlorocarbon polymer, or to bring the temperature of the plasticized polyvinyl chloride film to at least about 300° F.;

(b) As the final step in a conventional polyvinyl chloride resin calendaring operation;

(c) By extrusion of plasticized polyvinyl chloride from a plastic resin extruder, onto the polyethylene iminecoated trifluoromonochloroethylene polymer or copolymer sheet.

In all the above forms of application, the portion of the polyvinyl chloride directly in contact with the coating on the polytrifluoromonochloroethylene must be appreciably softened, for example, should reach a temperature of at least about 300° F. Light pressures applied in all the above applications are sufficient to insure intimate contact of the surfaces, and may range between about 5 p.s.i.g., and about 100 p.s.i.g. After the plasticized polyvinyl chloride film and the coated polytrifluoromonochloroethylene film are combined, the finished structure is advantageously subjected to a post-fabrication heat treatment preferably of at least about 1 minute at a temperature of about 300° F. The time of this secondary heat treatment may be reduced by raising the temperature, for example, 30 seconds at about 350° F. or the effect can be achieved at lower temperatures, for example, 5 minutes at 250° F. However, the longer periods tend to be less economical. In general, periods of between about 30 seconds and about 5 minutes at temperatures of between about 250° F. and about 350° F. are satisfactory. Cooling to ambient temperatures, e.g. 25° C. is then effected.

The polymerized ethylene imine used as bonding agent in my laminate is a strongly cationic polymer derived from ethylene imine having substantially the structure show below:

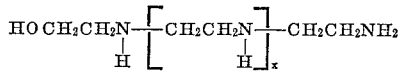

wherein the value of $x$ is in the range of about 700–900, and molecular weight is between 30,000 and about 40,000.

The amount of polymerized ethylene imine needed as a coating to achieve satisfactory bond strength can be as little as about 0.03 lb. per 3,000 square feet (i.e. per ream) although coatings of 0.1 to 0.3 lb./3,000 ft.$^2$ have been found more effective. In general, coating weights of between about 0.03 lb. and about 0.5 lb. per 3,000 ft.$^2$ are satisfactory.

The polytrifluoromonochloroethylene used as one layer of my laminate may be a homopolymer of trifluoromonochloroethylene or it may be a copolymer thereof with minor amounts of one or more fluorinated carbon compounds including vinylidene fluoride and tetrafluoroethylene. Particularly suitable are a copolymer of about 96% trifluorochloroethylene and about 4% vinylidene fluoride and a terpolymer of about 96% trifluorochloroethylene; 1% vinylidene fluoride and 3% tetrafluoroethylene. Films of the polymer or copolymers prepared by conventional procedures are suitable and may be of any desired thickness suitably between about 0.25 mil (thousands of an inch) and about 20 mils.

The plasticized polyvinyl chloride may consist of a homopolymer of vinyl chloride or a copolymer thereof with other polymerizable ethylenic compound such as vinyl acetate, methyl acrylate, etc., wherein the major proportion of the copolymer is vinyl chloride.

Plasticizers are suitably the high boiling liquid esters of dicarboxylic acids, boiling above about 200° C. at 5 mm. absolute pressure, for example, dioctyl phthalate, didecyl phthalate, didodecyl phthalate, dioctyl adipate, didecyl succinate and the like. They will usually be present in proportions of about 5 parts to about 60 parts plasticizer per 100 parts of polyvinyl chloride preferably between about 20 parts and about 50 parts per 100 parts of polyvinyl chloride.

Plasticized polyvinyl chloride films used in my laminates may be of any suitable thickness, for example, between about .5 mil and about 20 mils.

The resulting composite laminated film structure of my invention is useful in applications where the inertness of the trifluoromonochloroethylene polymer is desired, but reinforcement with plasticized polyvinyl chloride is needed to provide mechanical strength and flexibility under widely varying temperature conditions. The laminated film is particularly useful in the production of laminated containers for blood plasma, parenteral solutions, etc., which are to be stored at low temperatures, wherein the contents are exposed only to the trifluoromonochloroethylene polymer and wherein the plasticized polyvinyl chloride layer provides mechanical strength.

The following specific examples further illustrate my invention. Parts are by weight except as otherwise noted.

*Example 1*

A film of copolymer of about 96% trifluoromonochloroethylene with about 4% vinylidene fluoride having a thickness of about 1 mil was corona treated by exposing the surface of the film to a corona discharge. The treated film was then coated with a 2% aqueous-isopropanol solution of polyethylene imine of molecular weight 30,000 to 40,000. The film was dried in an oven at 220° F. The coated film was combined with a 15 mil plasticized polyvinyl chloride film containing about 25 parts of dioctyl phthalate as plasticizer per 100 parts of polyvinyl chloride, by passing the two films through squeeze rolls, the one behind the trifluoromonochloroethylene copolymer film being heated to 340° F. Passage through the rolls was at the rate of 3 feet per minute and was carried out in such a way that the polyethylene imine coating contacted the plasticized polyvinyl chloride film and became an intermediate layer between the trifluoromonochloroethylene polymer film and the plasticized polyvinyl chloride film. The resulting laminated film was tested for bond strength on an Instron tensile tester with a crosshead speed of 12 inches per minute pulling at 180° to the plane of the sample. The peel strength in the above test was found to be 2.0–2.5 pounds per linear inch. The laminated sample was then aged in an oven at 160° F. for 2 weeks to determine extent of plasticizer migration from the plasticized polyvinyl chloride film into the polyethylene imine layer and extent of weakening of the bond thereby. An Instron peel test carried out as described above, performed after the 2 weeks' ageing, showed a peel strength of 1.8 to 2.0 lbs./linear inch indicating excellent retention of bond strength indicative of very little, if any, plasticizer migration.

*Example 2*

A film, 2 mils thick, of a copolymer of 96% trifluoromonochloroethylene with about 1% vinylidene fluoride and about 3% tetrafluoroethylene, was corona treated as described in Example 1 and then coated with a 2% aqueous isopropanol solution of polyethylene imine. It was dried at 220° F. and had a dried coating weight of 0.32 lb. per 3,000 square feet. The precoated trifluoromonochloroethylene terpolymer was then combined with a plasticized polyvinyl chloride film of the same character as that described in Example 1, by passing the films through squeeze rolls, one of which was heated at 290°–300° F., with the polyethylene imine coating intermediate between the two polymer films. The resulting laminate was tested for peel strength on an Instron tester as described in Example 1 and the peel strength found to be 0.8–.95 lb./linear inch. Samples of the laminate were then heated at 300° F. for 1, 3 and 5 minutes and peel strengths of the heated samples tested with results shown below.

Pounds/linear inch
Control (no post heat) _____ 0.8–.95
Minutes at 300° F.:
1 _____ 5.0–5.5
3 _____ 6.5–7.0
5 _____ 7.0

The above results indicate that post heating of the laminated film increases the bond strength significantly, especially in the first minute of heating.

*Example 3*

A laminate prepared in a manner identical to that described in Example 2 above, except that a homopolymer of trifluoromonochloroethylene was used in place of the copolymer had a peel strength as tested on the Instron tester of 0.75 to 1.0 pound per linear inch.

While the above describes the preferred embodiments of my invention, it will be understood that departures can be made therefrom within the scope of the specifications and claims.

I claim:

1. A laminated film structure which comprises a layer of (1) a film of a polymer of trifluoromonochloroethylene selected from the group consisting of homopolymers of trifluoromonochloroethylene and copolymers theerof with vinylidene fluoride and tetrafluoroethylene wherein the trifluoromonochloroethylene is present in a major proportion, said film having thereon (2) a uniform, adherent coating of a polymerized ethylene imine of the magnitude of at least about .03 lb. per 3,000 square feet, said coating being joined in turn to (3) a film of plasticized polyvinyl chloride containing between about 5 parts and about 60 parts of a plasticizer per 100 parts of polyvinyl chloride.

2. The laminated film structure of claim 1 wherein the polytrifluoromonochloroethylene film is a copolymer of about 96% trifluoromonochloroethylene and about 4% vinylidene fluoride.

3. The laminated film structure of claim 1 wherein the polytrifluoromonochloroethylene film is a terpolymer of about 96% trifluoromonochloroethylene, about 1% vinylidene fluoride and about 3% tetrafluoroethylene.

4. The method for preparing a composite laminated film structure which comprises applying to the polymerized ethylene imine coating of a polyethylene imine-coated polytrifluoromonochloroethylene film, a film of plasticized polyvinyl chloride, applying light pressure to the resulting composite film while heating the portion of the plasticized polyvinyl chloride contiguous to the polyethylene imine to a temperature high enough to cause softening of said plasticized polyvinylchloride and thereafter cooling the composite film to produce a tightly bonded laminated film.

5. The method of preparing a composite laminated film structure which comprises applying to a thermoplastic film of a polymer from trifluoromonochloroethylene, selected from the group consisting of homopolymers of trifluoromonochloroethylene and copolymers thereof with vinylidene fluoride and tetrafluoroethylene wherein trifluoromonochloroethylene is present in a major proportion, and mixtures thereof, a coating of a polyethylene imine of molecular weight between about 30,000 and about 40,000, said coating having a thickness equivalent to between about 0.03 pound and about 0.5 pound per 3,000 square feet, contacting said polyethylene imine coating with a preformed film of plasticized polyvinyl chloride, applying pressure to the resulting composite film while heating the portion of the plasticized polyvinyl chloride film contiguous to the polyethylene imine to a temperature of at least about 300° F., continuing the heating of the resulting composite film at a temperature between about 250° F. and about 350° F. for a period of at least about 30 seconds, and thereafter cooling the composite film.

6. The process of claim 5, wherein the trifluoromonochloroethylene polymer is a copolymer of about 96% trifluoromonochloroethylene and about 4% vinylidene fluoride.

7. The process of claim 5, wherein the trifluoromonochloroethylene polymer is a terpolymer of about 96% trifluoromonochloroethylene, about 1% vinylidene fluoride and about 3% tetrafluoroethylene.

References Cited
UNITED STATES PATENTS 2,774,704  12/1956  Smith _____ 161—189
3,078,179  2/1963   Kuhn et al. _____ 161—254 X EARL M. BERGERT, *Primary Examiner.*

HAROLD ANSHER, *Examiner.*